United States Patent [19]
Knipe et al.

[11] Patent Number: 5,696,619
[45] Date of Patent: Dec. 9, 1997

[54] MICROMECHANICAL DEVICE HAVING AN IMPROVED BEAM

[75] Inventors: Richard L. Knipe, McKinney; John H. Tregilgas, Richardson; Thomas W. Orent, Garland; Hidekazu Yoshihara, Plano, all of Tex.

[73] Assignee: Texas Instruments Incorporated, Dallas, Tex.

[21] Appl. No.: 395,562

[22] Filed: Feb. 27, 1995

[51] Int. Cl.[6] .................................................. G02B 26/08
[52] U.S. Cl. .......................... 359/224; 348/770; 348/771; 148/423; 420/431
[58] Field of Search ........................... 359/224; 420/417, 420/431; 148/421, 423; 348/770, 771

[56] References Cited

U.S. PATENT DOCUMENTS

| | | | |
|---|---|---|---|
| 2,818,338 | 12/1957 | Swazy et al. | 420/417 |
| 3,433,626 | 3/1969 | Bomberger | 420/417 |
| 3,482,968 | 12/1969 | Hunter | 148/421 |
| 3,600,798 | 8/1971 | Lee | 29/592 |
| 3,886,310 | 5/1975 | Guldbert et al. | 178/7.5 D |
| 3,896,338 | 7/1975 | Nathanson et al. | 315/373 |
| 4,229,732 | 10/1980 | Hartstein et al. | 340/378.2 |
| 4,356,730 | 11/1982 | Cade | 73/517 |
| 4,728,185 | 3/1988 | Thomas | 353/122 |
| 5,041,851 | 8/1991 | Nelson | 346/160 |
| 5,061,049 | 10/1991 | Hornbeck | 359/224 |
| 5,079,544 | 1/1992 | DeMond et al. | 340/701 |
| 5,096,279 | 3/1992 | Horbeck et al. | 359/230 |
| 5,101,236 | 3/1992 | Nelson et al. | 355/229 |
| 5,350,466 | 9/1994 | Larsen et al. | 148/421 |
| 5,504,614 | 4/1996 | Webb et al. | 359/223 |
| 5,567,334 | 10/1996 | Baker et al. | |

FOREIGN PATENT DOCUMENTS

| | | | |
|---|---|---|---|
| 58-153749 | 9/1983 | Japan | 420/417 |

Primary Examiner—John Sheehan
Attorney, Agent, or Firm—Robert C. Klinger; James C. Kesterson; Richard L. Donaldson

[57] ABSTRACT

An electrically addressable, integrated, monolithic, micromirror device (10) is formed by the utilization of sputtering techniques, including various metal and oxide layers, photoresists, liquid and plasma etching, plasma stripping and related techniques and materials. The device (10) includes a selectively electrostatically deflectable mass or mirror (12) of supported by one or more beams (18) formed by sputtering and selective etching. The beams (18) are improved by being constituted of an impurity laden titanium-tungsten layer (52) with an impurity such as nitrogen, which causes the beams to have lattice constant different from TiW. The improved beams (18) exhibit increased strength, and decreased relaxation and creep.

12 Claims, 3 Drawing Sheets

MICROMECHANICAL DEVICE HAVING AN IMPROVED BEAM

CROSS REFERENCE TO RELATED APPLICATIONS

Cross reference is made to the following co-pending patent applications, each being assigned to the same assignee as the present invention and the teaching included herein by reference.

| Serial Number | Title | Filing Date |
| --- | --- | --- |
| 08/339,363 (now U.S. Pat. No. 5,552,424) | Micromechanical Device Having an Improved Beam | 11/14/94 |
| 08/396024 (now U.S. Pat. No. 5,567,334) | Method for Creating a Digital Micromirror Device Using an Aluminum Hard Mask | 02/27/95 |
| 08/268,741 | Improved Hinge for Micro-Mechanical Device | 06/30/94 |

FIELD OF THE INVENTION

The present invention relates to a micromechanical device having an improved beam, and, more particularly, to a micromirror device having an improved beam or hinge-like member. The present invention specifically relates to an electrically addressable, integrated, monolithic, micromirror device, the electrical and mechanical elements of which may be formed by the utilization of sputtering techniques, various metal and oxide layers, photoresists, liquid and plasma etching, plasma stripping and related techniques and materials, a selectively electrostatically deflectable mirror of which device is supported by one or more improved hinge-like cantilever and/or torsion beams formed by sputtering and selective etching, which beams exhibit increased strength, and decreased relaxation without requiring significant deviations from the typical processing steps employed to produce the otherwise unaltered device.

BACKGROUND OF THE INVENTION

Various types of micromechanical devices are known. Such devices include micromechanical spatial light modulators ("SLMs") having pixels formed of electrically addressable, deflectable mirrors or reflectors. SLMs are transducers capable of modulating incident light in correspondence to an electrical and/or optical input. SLMs are capable of modulating the incident light in phase, intensity polarization, and/or direction.

The present invention relates to SLMs of the foregoing type which are called digital micromirror devices or deformable mirror devices ("DMDs"). SLM DMDs of the type involved herein may be used in a variety of devices, such as printers, imaging systems, xerographic reproduction systems and digitized video systems. See commonly assigned U.S. Pat. Nos. 5,041,851, 4,728,185, 5,101,236 and 5,079,544.

Commonly assigned U.S. Pat. Nos. 5,061,049 and 5,096,279 (hereinafter "'049" and "'279") disclose the structure of, and methods of producing, preferred micromechanical devices, specifically DMD SLMs. In general, micromechanical devices typically include a deflectable or movable mass supported by a deformable beam. According to '049, a DMD SLM may include an array or matrix of relative thick, generally planar, metal mirrors or reflectors, constituting the "mass." Each mirror comprises a layer of aluminum or an aluminum alloy, such as Al(98.8%): Si(1%): Ti(0.2%) which is formed by sputtering and selective etching.

The mirrors reside on a relatively thin layer similarly constituted and also formed by sputtering and selective etching. Each mirror is supported by one or more beams. The beams comprise portions of the relative thin layer which extend beyond the boundary of each mirror and are, in turn, ultimately supported by one or more spacers or posts which may be constituted of a photoresist or a metal. The spacers or posts define or are separated by wells beneath the mirrors and into and out of which the mirrors may move when they are selectively deflected. The spacers or posts and the wells are, in turn, formed by selective deposition and removal or patterning of metal, insulative and photoresist laminae.

An undeflected DMD mirror may occupy a normal position which may be "horizontal," that is, above its well and generally parallel to a substrate on and in which the DMD is formed. Each normally positioned mirror reflects light incident thereon to a first destination. The mirror is selectively deflectable out of its normal position by the selective application thereto of a predetermined electrostatic attractive or repulsive force. A deflected mirror may be "nonhorizontal" or rotated out of the horizontal. Each deflected mirror modulates light incident thereon by reflecting the light to a second destination which depends on the amount of deflection and, accordingly, the presence and/or strength of the applied electrostatic force.

Movement of a mirror out of its normal position deforms its beam(s), storing potential energy therein. The stored potential energy tends to return the mirror to its normal position once the electrostatic force is removed. The beam(s) supporting a mirror may deform in a cantilever mode, in a torsional mode, or in a combination of both modes, called the flexure mode.

The selective electrostatic deflection of the mirrors of an array or matrix thereof is selectively effected by a congruent array or matrix of electrodes located on or in the substrate and on or at the bottoms of the wells. Selected electrostatic force-producing voltages are selectively applied to the electrodes by MOSFET or functionally similar elements and associated electrical components associated with the electrodes. These circuit elements and components are typically formed on and in the substrate by traditional integrated circuit manufacturing processing techniques. Specifically, the MOSFETs or other elements and their associated components, as well as the mirrors, beams, posts or spacers and electrodes are preferably integrally, monolithically formed by typical CMOS or similar techniques in and on a silicon or other substrate.

Extensive testing and analysis of the above-described type of micromechanical device has indicated that the strength of the thin-film beams is not sufficiently great to resist relaxation—a phenomenon also known as "creep" or "deformation"—thereof following sustained usage. Such relaxation of the beams results in improper operation of micromechanical DMD SLMs and other similar micromechanical devices. For example, a relaxed beam may be incapable of maintaining its mirror in, or returning its mirror to, the normal position when there is no attractive electrostatic force applied thereto. In a non-normal position, the mirror may reflect incident light to other than the first or second destinations. Thus, relaxation of a beam leads to unintended modulation of incident light. Additionally, even of relaxation does not result in a mirror not properly returning to its normal position, relaxation of the mirror's beam(s) can result in the mirror not deflecting by the appropriate amount upon the application of the predetermined voltage to the applicable electrode. Again, improper modulation of incident light results.

Beams which are stronger than those consisting of alloys and which are less subject to relaxation are known. For example, early developed SLMs related to the type described above utilized beam-like members comprised of silicon oxide. See U.S. Pat. Nos. 4,356,730, 4,229,732 and 3,886,310, each being assigned to the same assignee as the present invention and the teachings included herein by reference. It has also been generally proposed to fabricate the beam(s) of DMD mirrors from materials stronger than, and less subject to relaxation or creep than, the aluminum alloy described above. The use of some of these materials carries with it, however, the likelihood that the processing sequences and materials (e.g., etchants) presently used to fabricate DMDs, including their addressing circuitry and mechanical elements, would require substantial modification, possibly adding to the complexity of processing resulting in a concomitant increase in the cost of producing DMDs.

Commonly assigned U.S. Pat. No. 5,552,424, entitled "Micromechanical Device Having An Improved Beam" discloses a DMD beam which is constituted of one or more ordered electrically conductive aluminum compounds, the teachings of which are included herein by reference. The beam is constituted of an aluminum compound of the general formula $Al_xQ_y$, where Q is not oxygen, the compound having a relatively high melting point and exhibiting fewer slip systems than FCC crystalline structures. Q may be gold, calcium, copper, iron, hafnium magnesium, niobium, nickel, scandium, cobalt, tantalum, zirconium, barium, molybdenum, strontium, tungsten, ruthenium vanadium, chromium, iridium, rhodium, lithium, antimony, titanium, cerium, gadolinium, holmium, lanthanum, lutetium, neodymium, samarium, terbium, selenium, carbon, arsenic, boron, phosphorus or nitrogen. The beam may also be viewed as being constituted of an electrically non-insulative material selected from the group consisting of an electrically conductive, ordered aluminum intermetallic compound or a mixture of two or more such aluminum compounds, and may comprise $Al_2Au$, $Al_2Ca$, $Al_2Cu$, $Al_3Fe$, $Al_3Hf$, $Al_3Mg_2$, $Al_3Nb$, $Al_3Ni$, $Al_3Sc$, $Al_3Ta$, $Al_3Zr$, $Al_4Ba$, $Al_4Mo$, $Al_4Sr$, $Al_4W$, $Al_6Ru$, $Al_7Cr$, $Al_8V_5$, $Al_9Co_2$, $Al_9Ir_2$, $Al_9Rh_2$, AlLi, $Al_3Ti$, AlTi, AlSb, AlAs, AlP, AlN, $Al_3Ce$, $Al_3Gd$, $Al_3Ho$, $Al_3La$, $Al_3Lu$, $Al_3Nd$, $Al_3Sm$, $Al_3Tb$, $Al_2Se_3$, $Al_4C_3$, $AlB_2$, AlTi+$Al_3$Ti, and $Al_3$Ti+AlN. In more general terms, the beam is constituted of an ordered, electrically conductive material selected from the group consisting of intermetallic compounds which include aluminum, compound semiconductors which include aluminum, compounds which include aluminum and a rare earth, and compounds which include aluminum and a non-metal, and aluminum compounds which include transition metals.

It has also been proposed to fabricate beams with multiple laminae of aluminum or alloy alternating with laminae of a stronger, less ductile material, such as alumina, as disclosed in co-pending patent application Ser. No. 08/268,741, filed Jun. 30, 1994, entitled "Improved Hinge for Micro-Mechanical Device", this patent being assigned to the same assignee as the present invention and the teaching included herein by reference. The outer laminae are aluminum or aluminum alloy, so that the majority of the processing steps involving etching remain the same as those described above to produce the traditional DMD structure. Because the alternating laminae are produced by periodically interrupting sputter deposition of the aluminum or aluminum alloy and sputter depositing the stronger, less ductile material, the process is complicated to that extent, and production costs may be increased.

A desiderata of the present invention is the provision of micromechanical devices, such as DMD SLMs, having beams which are stronger and relaxation-resistant, the beams being fabricated with no added complexity or cost of the DMD processing sequence. It is desired to control thin form stresses in the beam by eliminating them entirely, or by creating beam stresses that are only slightly tensile to avoid sagging.

SUMMARY OF THE INVENTION

According to the present invention, there is provided an improved deformable beam for a micromechanical device. The device includes a deflectable mass supported by the beam. Deflection of the mass deforms the beam. In preferred embodiments, the micromechanical device is a DMD SLM, and the mass is a movable or deflectable mirror which selectively modulates incident light as the mirror deflects.

The improved beam may be characterized in one or more of the following ways:

The beam is constituted of titanium-tungsten and another element or impurity which results in an altered lattice d-spacing, which may be wholly or partly other than the body-centered-cubic ("BCC") structure of titanium-tungsten, the impurity or element being nitrogen, oxygen, boron, silicon or carbon and comprising between 0.1% and 37% atomic.

The beam is constituted of a titanium-tungsten film alloyed with nitrogen, with the TiWN film having either a face-centered-cubic ("FCC") crystalline structure or body-centered-cubic ("BCC") crystalline structure.

In the previous characterization, the TiWN films are reactively sputtered in a nitrogen-argon atmosphere, with the percentage of nitrogen in the atmosphere being 2%–16%. Moreover, the sputtered films may be mixtures of TiN, $W_2N$ and W.

In all of the above characterizations, beams so constituted are stronger and experience less relaxation than prior art beams, especially those made of pure aluminum or lightly alloyed alumina. The improved beams are fabricated over a 100Å etch stop, with the manufacturing Of DMDs requiring only minor modifications of typical etching chemistries and procedures. The aluminum etch stop allows the beams to be plasma etched without exposure to a photoresist spacer layer thereunder. The spacer layer is removed by an ash process during an undercut process after fabrication of the DMD superstructure. Further, the beams are electrically conductive, thus permitting appropriate potentials to be applied to the mirrors via the beams, as occurs in typical prior art DMDs.

BRIEF DESCRIPTION OF THE DRAWINGS

FIGS. 4–6 contain plan views of a variety of DMD SLMs functionally similar to those shown in FIGS. 1–3, wherein FIG. 6 depicts one type of flexure beam DMD, the beams of all of the foregoing DMDs advantageously being constituted and fabricated according to the principles of the present invention.

DETAILED DESCRIPTION

Figure 1:
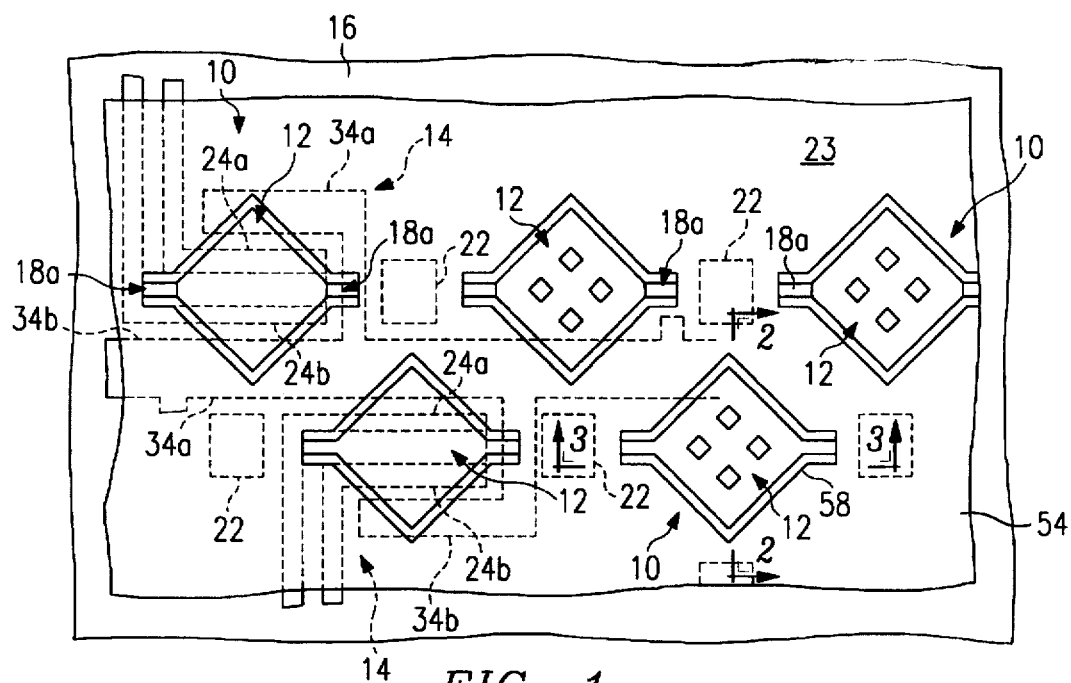
FIG. 1 is a plan view of a portion of an array of DMD SLM-type micromechanical devices illustrating the movable or deflectable masses or mirrors thereof supported by deformable torsion beams which are constituted and fabricated in accordance with the principles of the present invention.

Referring first to FIG. 1, there are shown a plurality of micromechanical devices in the form of adjacent, individual DMD's 10, which may be of the type shown in commonly assigned U.S. Pat. Nos. 5,061,049 to Hornbeck and 3,600,798 to Lee. The DMI's 10 may also be similar to those shown in U.S. Pat. Nos. 4,356,730 to Cade, 4,229,732 to Hartstein et al, 3,896,338 to Nathanson et al, and 3,886,310 to Guldberg et al. The DMDs 10 may be located in an array as depicted in FIG. 1 and may be used as pixels in a spatial light modulator for systems such as those shown and described in commonly assigned U.S. Pat. Nos. 5,101,236 to Nelson et al, 5,079,544 to DeMond et al, 5,041,851 to Nelson, and 4,728,185 to Thomas. The teachings of all above identified patents are incorporated herein by reference. In the following Description, the DMDs 10 are described as operating in a bistable or digital mode, although they may be operated in other modes, such as tristable or analog.

Figure 2:
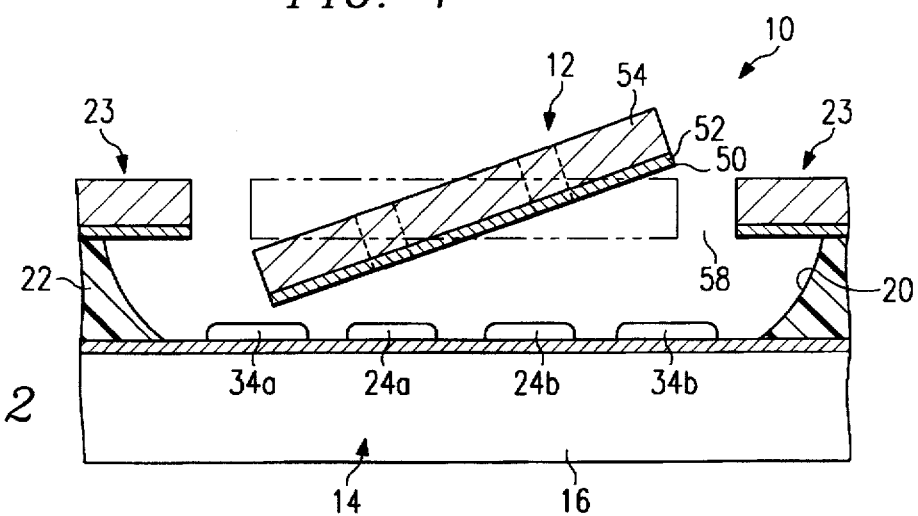
FIG. 2 is a partially sectioned side view of a single DMD taken generally along line 2—2 in FIG. 1.
Figure 3:
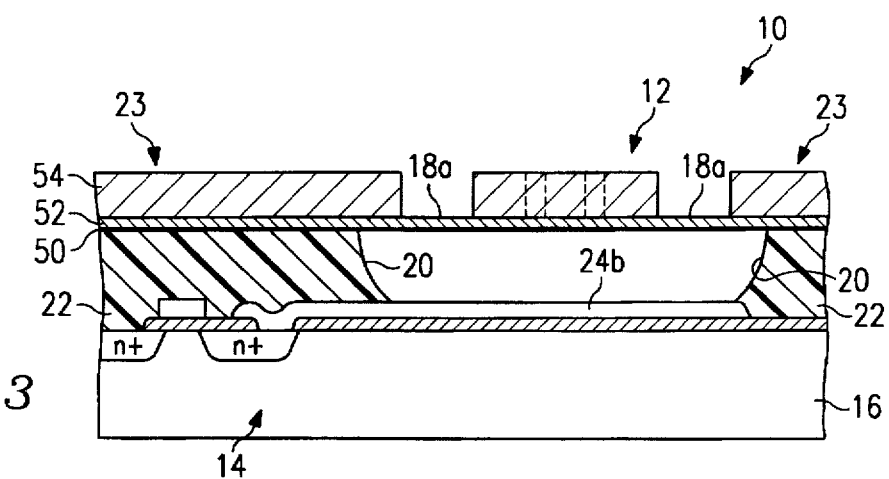
FIG. 3 is a partially sectioned side view of the DMD shown in FIG. 2 and taken generally along line 3—3 in FIG. 1.

As generally depicted in FIG. 1–3, each DMD 10 includes a selectively movable or deflectable mass, which in the case of the DMDs 10 comprises a relatively thick and massive, metal or metallic light-reflective, movable or deflectable mirror 12 and associated addressing circuits 14 (only two of which are shown) for selectively electrostatically deflecting the mirrors 12. Methods of monolithically forming an array of mirrors 12 and their addressing circuits 14 in and on common substrate 16 are set forth in the above-noted patents. Of course, micromechanical devices other than the DMDs 10 depicted and described in detail herein may advantageously utilize the principles of the present invention.

Figure 5A:
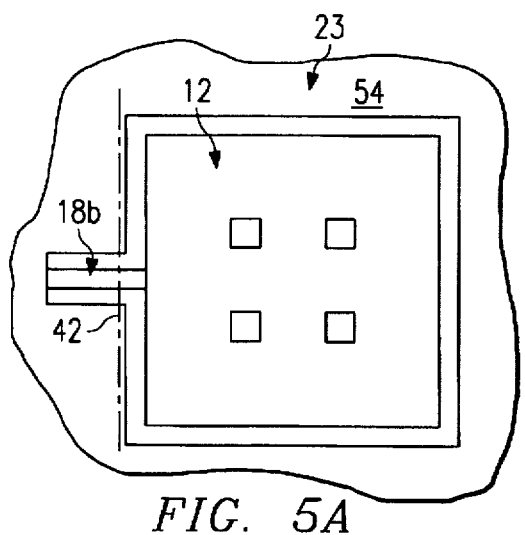
FIGS. 5a–5b depict two types of cantilever beam DMDs.
Figure 5B:
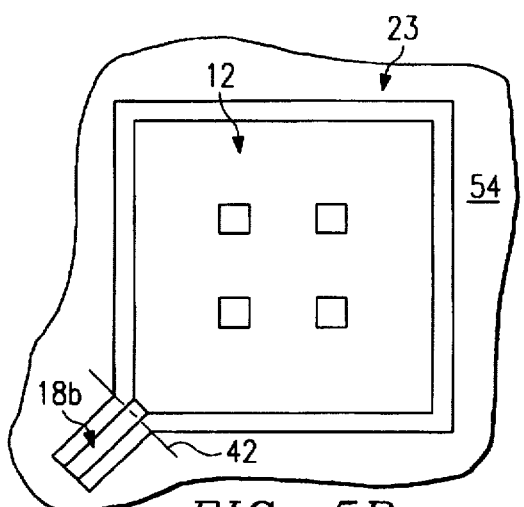
Figure 6:
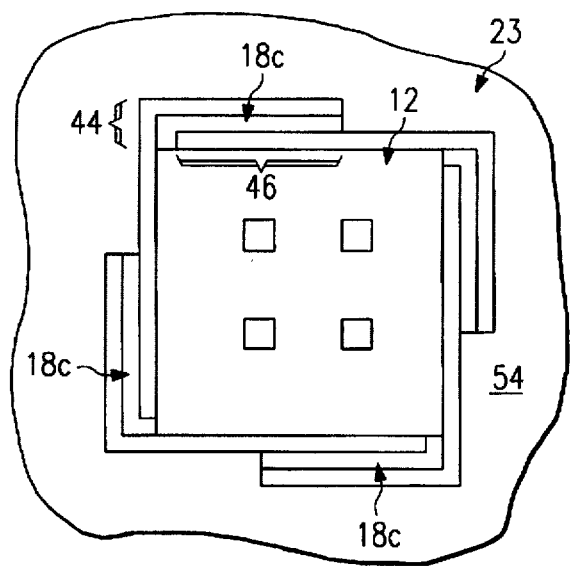

Typically, each mirror 12 deflects by moving or rotating on one or more relatively thin, integral supporting beams or hinges 18. Although FIG. 1 illustrates each mirror 12 being supported by a pair of diametrically opposed torsion beams 18a, the mirrors 12 may be supported by one or more cantilever beams 18b—two types are shown in FIG. 5a and FIG. 5b or flexure beams 18c—one type is shown in FIG. 6 as discussed earlier. FIGS. 4a–4d depict four types of torsion beam-supported DMDs 10.

Undercut wells 20 (not shown in FIG. 1) are defined between columnar members 22, which may comprise residual photoresist remaining on the substrate 16 after functioning as a portion of a etching, deposition, and/or implantation mask during the formation of the DMD 10. The beams 18 and metallic portions 23 which surround the mirrors and beams 10 and 12 and are generally coplanar with the mirrors 12 are supported by the members 22.

Each well 20 accommodates the deflection thereinto of at least a portion of its associated mirror 12 by permitting that portion to move toward the substrate 16, as shown by the directional arrows in FIG. 2, from an undeflected or normal position, shown FIG. 3. Deflection of each mirror 12 is effected by the attractive or repulsive electrostatic forces exerted thereon by electric shields which result from the application of appropriate potentials to the mirrors 12 and to associated control or addressing electrodes 24 located in the wells 20. The potentials are selectively applied to the control electrodes 24 and the mirrors 12 by the addressing circuits 14 and associated circuitry and circuit elements. Typically, the mirror 12 is at ground potential while selected voltages are applied to the control electrodes 24, thereby exerting an attractive force on the mirrors 12. Repulsive forces may be applied to the mirrors 12 by applying potentials of the same polarity to the mirrors 12 and their control electrodes 24.

When a beam 18 is undeformed, it may set the normal position of its mirror element 12, as shown in FIG. 3 and in phantom in FIG. 2. When the beam 18 is deformed, it stores therein energy which tends to return the mirror 18 to the position it occupies when the beam 18 is undeformed. Light which is incident on the device 10 when a mirror element 12 is in its normal position is reflected to a first site. When an addressing circuit 14 applies appropriate potentials, its mirror 12 is electrostatically attracted or repelled out of its normal position toward or away from the control electrode 24 and the substrate 16. The mirror element 12 accordingly moves or deflects until it engages a landing electric position.

The use of the landing electrode 34 is recommended by the aforenoted '279 patent. Specifically, the landing electrode 34 is maintained at the same potential as the mirror 12 and serves as a mechanical stop for the mirror element 12, thus setting the deflected position thereof. Further, the engagement of the landing electrode 34 and the mirror element 12 prevents the mirror element 12 from engaging the control electrode 24. Because of the potential difference between the mirror element 12 and the control electrode 24, such engagement would result in current flow through the mirror element 12. Current flow of this type is likely to weld the mirror element 12 to the control electrode 24 and/or to fuse or melt the relatively thin beam 18.

In the deflected position of the mirror element 12, the incident light is now reflected to a second site. The first site to which light is directed when a mirror 12 is undetected may be occupied by or constitute a utilization device, such as a viewing screen or a photosensitive drum of a xerographic printing apparatus. The light directed to the second site may be absorbed or otherwise prevented from reaching the first site. The roles of the first and second sites may, of course, be reversed. In the foregoing way, incident light is modulated by the DMDs 10 so that it selectively either reaches or does not reach whichever site contains the utilization device.

In FIGS. 1–3, each mirror 12 is shown to be associated with a pair of control electrodes 24a,24b and a pair of landing electrodes 34a,34b. When the DMDs 10 are operated in a binary or bistable mode, as described above, each mirror 12 may be movable between the normal, undeflected position represented in phantom in FIG. 2, and a counterclockwise rotated position, as shown in FIG. 2. Although not depicted in FIG. 2, counterclockwise rotation of the mirror 12 occurs until the mirror 12 engages of contacts the left-hand landing electrode 34a. If the mirror 12 is at the preferred ground potential, counterclockwise rotation of the mirror 12 may be effected by the application of a voltage to the left-hand control electrode 24a by the addressing circuitry 14. In this latter event, the right-hand control and landing electrodes 24b and 34b may be eliminated or unused.

If the mirror 12 is rotated by electrostatic repulsion, it and the right-hand control electrode 24b will carry same polarity potentials to achieve the counterclockwise rotation shown in FIG. 2. In this event, the left-hand control electrode 24a and the right-hand landing electrode 34b may be eliminated or unused.

The DMDs may also be operated in a binary mode in which the mirror 12 is rotatable between a normal, fully counterclockwise position and a fully clockwise position in which the mirror 12 engages the right-hand landing electrode 34b. When operated in this fashion, the undeformed beam 18 does not set the normal position of the mirror 12. Further, with the mirror 12 at ground potential, the mirror 12 is fully counterclockwise rotated by a potential on the control electrode 24a; the potential on the control electrode 24b has a very low magnitude or is zero. The mirror 12 is rotated fully clockwise to abut the right-hand landing electrode 34b by an appropriate potential on the control electrode 24b, with the potential on the control electrode 24a being zero or nearly so.

In a further binary operational permutation in which the mirror 12 is not at ground potential, voltages of different polarities and/or magnitudes may be simultaneously applied to the control electrodes 24a,24b to simultaneously attract and repel complementary portions of the mirrors 12 for selective rotation thereof. Tristable operation is achieved by rotating the mirrors 12 fully counterclockwise or fully clockwise, with the mirrors occupying a normal intermediate position set by the undeformed beam when the control electrodes 24a,24b are both deenergized. Analog operation is achieved by selected amounts of counterclockwise and/or clockwise rotation of the mirrors 12 through the application to the control electrodes 24a,24b of potentials having appropriate magnitudes. In analog operation, full rotation of the mirrors 12, characterized by engagement of the landing electrodes 34a,34b, is only one of a theoretically infinite number of rotated positions which the mirrors 12 may occupy.

Figure 4A:
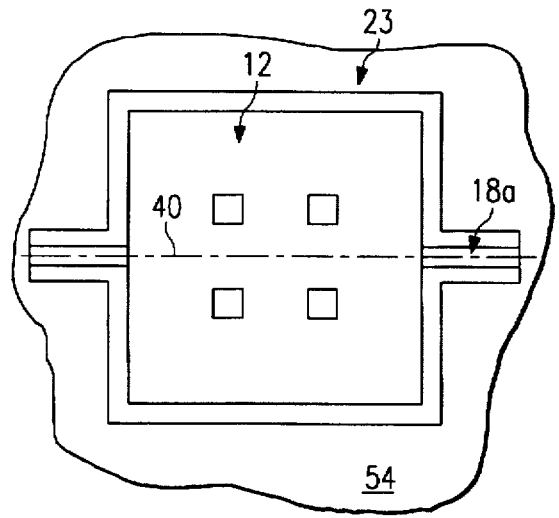
FIGS. 4a–4d depict four types of torsion beam DMDs.
Figure 4B:
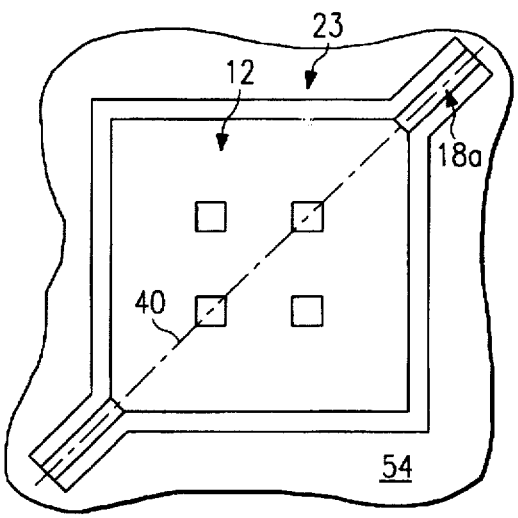
Figure 4C:
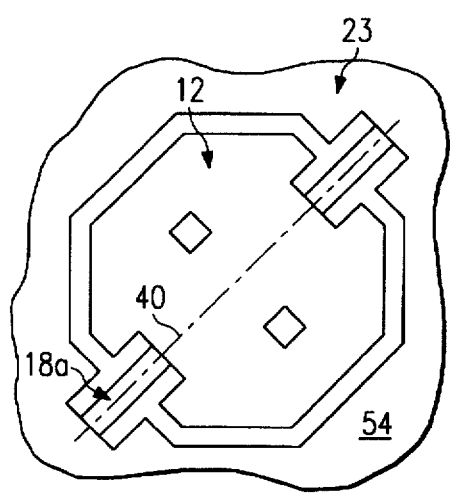
Figure 4D:
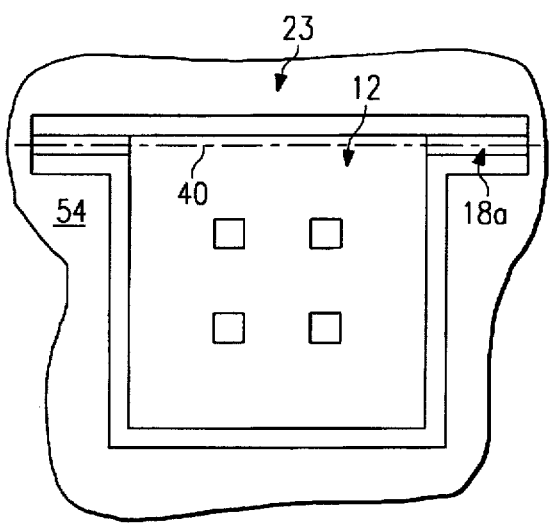

FIGS. 4a–4d illustrate a variety of DMDs in which the mirrors 12 are supported by torsion beams 18a, including in FIG. 4b, the variety generally shown in FIGS. 1–3. As described above, mirrors 12 supported by torsion beams 18a are selectively rotatable on the beams 18a about an axis 40 which is coincident with the beams 18a. The axis 40 of rotation is coincident with an axis of symmetry of the mirror 12 in all but the lower fight rendition, wherein the axis 40 is not so coincident. In FIG. 5a and FIG. 5b, the beams 18 are cantilever beams 18b, and the mirrors 12 are movable or deflectable about an axis 42 of rotation which is normal to the beams 18b. Though not shown in FIGS. 4a–4d and FIGS. 5a–5b, as should be apparent, the control electrodes 24 must be asymmetrically located relative to the axes 40 and 42 of rotation.

In FIG. 6 the beams 18 are so-called flexure beams 18c which deform in both torsional and cantilever modes upon movement of the mirrors 12. Specifically, each flexure beam 18c includes a torsionally deformable element 44 and an element 46 which is deformable in a cantilever mode. Upon attraction of the mirror 12 to or repulsion of the mirror 12 from the control electrode 24 the mirror 12 moves pistonlike by remaining generally parallel to the substrate 16.

Returning to FIGS. 1–3, and according to the preferred embodiment of the present invention, it may be seen that each DMD 10 may include two or more layers, such as the metallic layers 50, 52, and 54 which are shown. These layers may be selectively deposited and patterned or etched pursuant to, and in the course of carrying out, typical procedures used to manufacture monolithic integrated circuits. In this way, the mirrors 12, beams 18 and control circuitry 14 may all be produced by a continuous series of interrelated process steps. Layer 52 is comprised of TiW with an impurity, as will be described shortly, and layers 50 and 54 comprise of aluminum/aluminum alloy. In the past, only layers 52 and 54 were provided and comprised an alloy of Al:Si:Ti in the percent ratio of about 98.8: 1: 0.2, with the layer 52 being from about 500 to about 1000Å thick and the layer 54 being from about 3,000 to about 5000Å thick, although other thicknesses have been used. Layer 50 was not needed since there was no plasma etching, and an etch stop to protect a photoresist spacer layer 22 was not needed. Rather, the aluminum/aluminum alloy hinge layer 52 was etched down to the photoresist spacer layer thereunder.

To fabricate DMDs 10, the relatively thin 100Å layer 50 of aluminum/aluminum alloy is first deposited, typically by sputtering, on the free surface of a previously deposited, continuous layer of the photoresist 22. The relatively thicker hinge layer 52 of Titanium-Tungsten (TiW) is then deposited on the free surface of the layer 50 in an impurity laden atmosphere, as will be described shortly. The composition of TiW is typically 7–10% by weight titanium with the balance being tungsten. Next, the hinge layer 52 is coated with a hinge mask comprised of an oxide. Next, beam layer 54 comprised of an alloy of Al:Si:Ti is then sputter deposited on hinge layer 52 and the oxide hinge mask. Selective patterning of beam layer 54 and subsequent etching removes the unmasked layer 54 where the peripheries of the mirrors 12 and the beams 18 are to reside. The Al:Si:Ti beam 18 has reflective properties to serve as mirrors 12. (See FIG. 1) Next, the impurity laden TiW hinge layer 52 is plasma etched where it is unmasked by the hinge pattern oxide layer, with the thin aluminum layer 50 acting as an etch stop over photoresist 22. Between these peripheries and the surrounding regions 23 there are defined access gaps 58. Selective removal of the photoresist 22, as by plasma etching thereof through the access gaps 58 produces the wells 20.

Figure 7A:
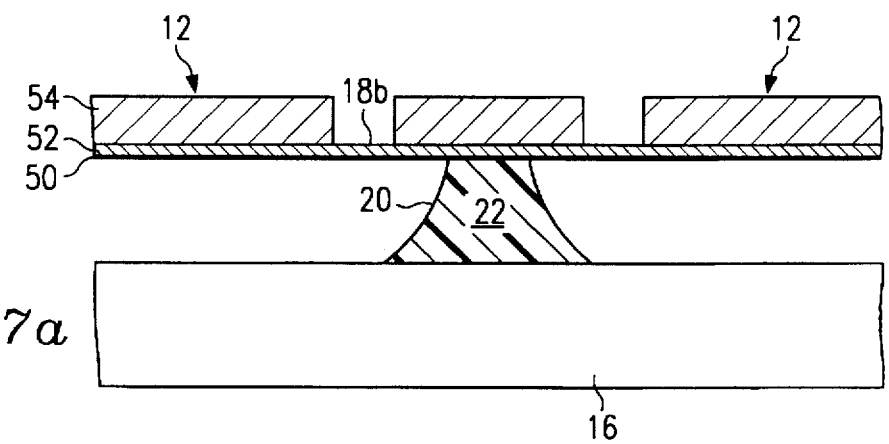
FIG. 7 contains side views of two different types of cantilever beam DMDs, FIG. 7a depicting such a DMD having a photoresist spacer supporting a cantilever beam and FIG. 7b depicting a metal post supporting a cantilever beam, all of the beams therein being conveniently constituted and fabricated pursuant to the teachings of the present invention.
Figure 7B:
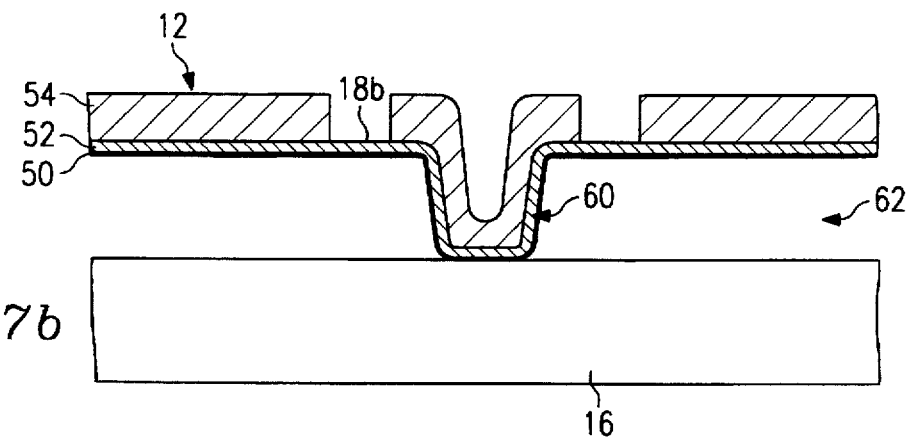

In some embodiments, it may, as noted above, be preferred for the support of the beams 18 and their mirrors 12 to be achieved by the columnar photoresist 22 which remains after formation of the wells 20. FIG. 7a illustrates this type of support in a cantilever-beam 18b DMD 10, instead of the torsion-beam 18a DMDs 10 of FIGS. 1–3. FIG. 7b illustrates a somewhat differently constructed hidden-hinge, cantilever-beam 18b DMD 10, in which support for the beam 18b and the mirror 12 is provided by a metallic post 60 which suspends the mirror 12 over an open area 62 which serves the same function as the well 20. FIGS. 35a–35e of the '049 patent illustrate a first method of manufacturing DMDs 10 of the type shown in FIGS. 1–3, 4a–4d, 5a–5b, 6 and 7a ; hereof. In those Figures of the '049 patent, the layer 326 is a sputtered light aluminum layer which ultimately serves as a beam 18 and a sputtered light aluminum layer 328 ultimately forms the reflective mirror 12. In the same patent, FIGS. 40a–40e illustrate an alternative method for forming the DMDs 10 of the present invention in which the beams 18 are produced from a sputtered light aluminum alloy layer 180 and the mirrors 12 are produced from a sputtered light aluminum layer 190.

When a mirror 12 is in a deflected position, its beam 18 is deformed and, accordingly, it stores energy therein which tends to return the mirror element 12 to the position it occupies when the beam 18 is undeformed. In theory, when the control electrode 24 is de-energized by the addressing circuit 14, the stored energy will return the mirror element 12 to this position.

DMDs 10 of the above-described types have been extensively operated and tested. Such testing indicates that DMDs 10 may experience improper operation or fail to operate due to several causes.

One cause of improper operation or failure of DMDs 10 is discussed in commonly assigned U.S. Pat. No. 5,096,279. Specifically, the mirror 12 and the landing electrode 34 which are engaged during deflection of the former may become adhered, welded or otherwise stuck together so that simple deenergization of the control electrode 24 may not result in the mirror element 12 returning to the position it occupies when the beam 18 is undeformed. Special reset signals may be applied to the control electrode 28 which overcome the sticking or adhering together of the mirror element 12 and the landing electrode 34. Other techniques for preventing the mirror elements 12 and the landing electrodes 34 from sticking include coating these elements with appropriate substances.

Another cause of improper operation or failure of DMDs 10 relates to the fact that their beams 18 have typically comprised the layer 50 of aluminum alloy. The aluminum alloy exhibits a relatively low yield stress, and beams 18 fabricated therefrom deform over time due to creep, relaxation or deformation. These phenomena may result in catastrophic failure or breakage of a beam 18 or in a mirror 12 being positioned in other than the position dictated by the condition of its addressing circuitry 14.

A previous solution disclosed in co-pending patent application Ser. No. 08/268,741 filed Jun. 30, 1994, entitled "Improved Hinge for Micro-Mechanical Device", as to weak beams 18 was to substitute in the layer 52 a material which is more mechanically robust and has a yield stress which is significantly higher than aluminum or aluminum alloy. One specific substitution involved constituting the layer 52 in whole or in part of titanium-tungsten (TiW), which may by deposited by co-sputtering and vapor deposition procedures. Typically, TiW layers 52 have been produced on top of a thin (about 100 Angstrom) aluminum layer 50 the latter layer 50 serving as an etch stop for plasma etchants used with the TiW layer. When the TiW layer 52 and thin aluminum layer 50 are used as discussed, "sag" of the resulting hinges has been observed. The "sag" is attributed to higher than desired compressive stresses in the hinge. However, TiW is creep resistant.

The present invention replaces the layer 52 of Al: Si: Ti or other aluminum alloy with TiW which is more mechanically robust than aluminum or aluminum alloy, and further, alloys the TiW with an impurity such as nitrogen so that the d-spacing of the crystalline structure of the layer 52 is altered and not the typical BCC. The inherently robust mechanical properties of TiW films may be enhanced by adding to them or alloying them with another impurity. Such impurity may be nitrogen, oxygen, boron, silicon or carbon. The addition of these impurities has been found to alter the typical BCC crystalline structure of TiW films to another crystalline structure—FCC in the case of TiWN, when the concentration of the impurity i.e. nitrogen is high enough. The selected impurity can be introduced into the TiW layer 52 by standard methods including co-sputtering, reactive sputtering, reactive evaporation and chemical vapor deposition, and co-evaporation.

A preferred impurity is N. TiWN layers 52 have been produced by reactively sputtering Ti and W as films onto the thin aluminum etch stop layer 50 in an argon-nitrogen atmosphere, with nitrogen comprising about 2%–16% of the sputtering atmosphere. When a high nitrogen level is used, the layer 52 can have an FCC crystalline structure with greater than about 31% atomic nitrogen, rather than the BCC structure exhibited by TiW. At lower Nitrogen levels, a mixed FCC-BCC structure can exist, with about 18%–20% atomic nitrogen. A BCC structure can be retained at low nitrogen levels with 0.1%–18% atomic, but the lattice constant or d-spacing is shifted from that of TiW by an mount which depends on nitrogen content. Although there is some evidence to suggest that the films constituting the layer 52 are a mixture of TiN, W and $W_2N$, the present invention may be otherwise characterized. Basically, enough of a chosen impurity needs to be introduced to alter the lattice d-spacing from that of TiW.

Though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications. For instance, a more reflective coating can be deposited upon beam 12 if desired. In another alternative embodiment, an elevated pixel mirror is fabricated upon beam 12, and limitation to the particular design of DMD 10 is not to be inferred. Moreover, limitation to the particular thicknesses of layers 50, 52, and 54 is not to be inferred, and the thicknesses disclosed can be modified depending on the particular electrical, optical and mechanical characteristics desired, and the processing methods implemented.

I claim:

1. An improved deformable beam for a micromechanical device which includes a deflectable mass supported by the beam, the beam being deformed upon deflection of the mass, wherein the improvement comprises:

the dents being constituted of an electrically conductive layer of titanium-tungsten containing an alloying element at a level above 0.1% atomic, said beam being constituted of at least 90% by weight tungsten, wherein said alloying element is selected from the group of nitrogen, oxygen, boron, silicon and carbon.

2. An improved beam as in claim 1, wherein the layer has a lattice constant different from a lattice constant of a Ti:W alloy.

3. An improved beam as specified in claim 2 wherein the layer has a crystalline structure other than BCC.

4. An improved beam as in claim 1, wherein the micromechanical device is an SLM, and the mass is a mirror.

5. An improved beam as in claim 1, wherein the alloying element is nitrogen and the layer has FCC crystalline structure.

6. An improved beam as in claim 1, wherein the layer is formed by reactive sputtering in an atmosphere which includes nitrogen.

7. An improved beam as in claim 5 wherein the nitrogen comprises 2% to 16% by volume of the sputtering atmosphere.

8. An improved beam as in claim 6, wherein the layer is a mixture of TiN, $W_2N$ and W.

9. An improved beam as in claim 6, wherein the nitrogen comprises 2% to 16% by volume of the sputtering atmosphere.

10. An improved beam as in claim 1, wherein the micromechanical device is an SLM, and the mass is a mirror.

11. An improved beam as in claim 1, wherein the layer is produced by co-sputtering, reactive sputtering, reactive evaporation, chemical vapor deposition, or co-evaporation.

12. An improved beam as in claim 11, wherein the micromechanical device is an SLM, and the mass is a mirror.

* * * * *